(12) United States Patent
Djupsjöbacka

(10) Patent No.: US 6,337,756 B1
(45) Date of Patent: Jan. 8, 2002

(54) OPTICAL TRANSMITTER SYSTEM AND METHOD

(75) Inventor: Anders Djupsjöbacka, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/136,514

(22) Filed: Aug. 19, 1998

(30) Foreign Application Priority Data

Aug. 20, 1997 (SE) ................................. 9703001

(51) Int. Cl.$^7$ ................................. H04B 10/04
(52) U.S. Cl. .................. 359/181; 359/180; 375/291
(58) Field of Search .............................. 359/180–181, 359/188; 375/291

(56) References Cited

U.S. PATENT DOCUMENTS

| | | | |
|---|---|---|---|
| 5,170,274 A | 12/1992 | Kuwata et al. | 359/182 |
| 5,359,449 A | 10/1994 | Nishimoto et al. | 359/181 |
| 5,532,857 A | 7/1996 | Gertel et al. | 359/154 |
| 5,543,952 A | 8/1996 | Yonenaga et al. | 359/181 |
| 5,917,638 A * | 6/1999 | Franck et al. | 359/181 |
| 6,097,525 A * | 8/2000 | Ono et al. | 359/181 |

FOREIGN PATENT DOCUMENTS

WO      WO95/29539      11/1995

OTHER PUBLICATIONS

A.H. Gnauck, et al., "Dispersion Penalty Reduction Using an Optical Modulator with Adjustable Chirp", IEEE Photonics Technology Letters, vol. 3, No. 10, Oct. 1991, pp. 916–918.

X. Gu, et al., "10 Gbit/s Unrepeatered Three–Level Optical Transmission Over 100 km of Standard Fibre", Electronics Letters, vol. 29, No. 25, Dec. 9, 1993, pp. 2209–2211.

P.B. Hansen, et al., "A Dual–Drive Ti:LiNbO$_3$Mach–Zehnder Modulator Used as an Optoelectronic Logic Gate for 10–Gb/s Simultaneous Multiplexing and Modulation", IEEE Photonics Technology Letters, vol. 4, No. 6, Jun. 1992, pp. 592–593.

G. May, et al., "Extended 10 Gb/s Fiber Transmission Distance at 1538 nm Using a Duobinary Receiver", IEEE Photonics Technology Letters, vol. 6, No. 5, May 1994, pp. 648–650.

* cited by examiner

Primary Examiner—Kinfe-Michael Negash
(74) Attorney, Agent, or Firm—Burns, Doane, Swecker & Mathis, L.L.P.

(57) ABSTRACT

The present invention relates to an optical duobinary transmitter system and method using optical intensity modulation. The system comprises an input terminal (51) arranged to receive a first binary signal, a driving circuit (53) connected to the input terminal and arranged to convert the first binary signal into a second and a third binary signal, a double electrode optical modulator (55) connected to the driving circuit in such a way that its upper and lower electrode may be driven by said second and third binary signal, respectively, said modulator being further arranged to modulate the amplitude and phase of an optical carrier according to the binary driving signals so as to provide an optical duobinary signal corresponding to said first binary signal and with a predetermined negative modulation chirp parameter, and an output terminal (57) connected to the optical modulator and arranged to feed an optical transmission line with the modulated optical duobinary signal. The modulator may alternatively be arranged to be driven by quasi-ternary signals.

20 Claims, 6 Drawing Sheets

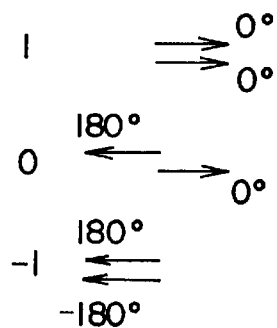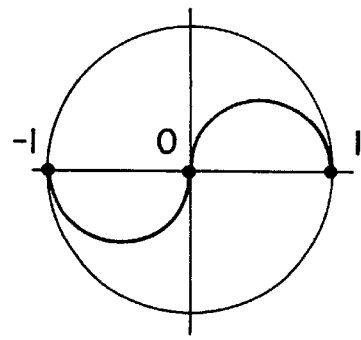
Fig. 7a    Fig. 7b
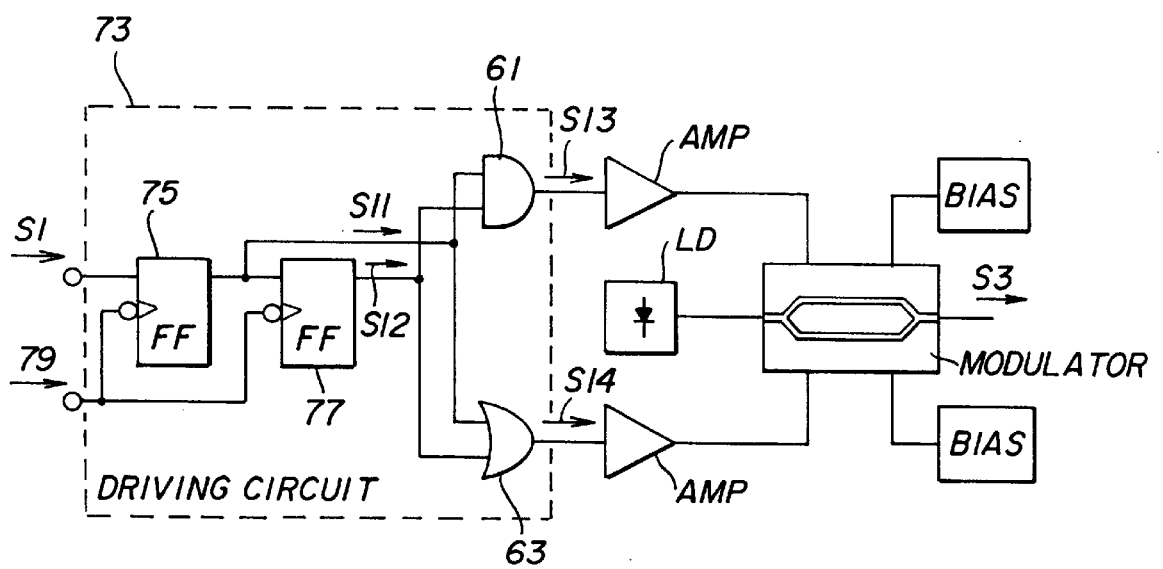
Fig. 8

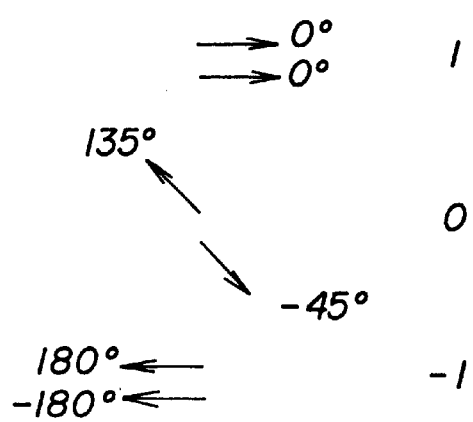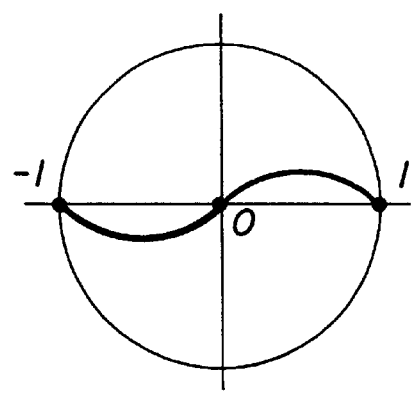
Fig. 11a                    Fig. 11b

OPTICAL TRANSMITTER SYSTEM AND METHOD

TECHNICAL FIELD OF THE INVENTION

The present invention relates to an optical duobinary transmitter system and method using optical intensity modulation.

DESCRIPTION OF RELATED ART

At high bit rates, the chromatic dispersion in standard single mode fibers (SSMF) limits the transmission distance in the 1550 nm window. There has been a number of different methods proposed to overcome this limitation of which the most common are pre-chirped modulators, dispersion compensating fibers, chirped Bragg gratings, mid-span spectral inversion, and special signal formats such as dispersion supported transmission and duobinary transmission.

Duobinary transmission has been investigated for modulators showing no or very little chirp, i.e. α≈0, see, e.g. Gu et al., 10 Gbit/s unrepeatered three-level optical transmission over 100 km of standard fiber, Electron. Lett., Vol. 29, No. 25, 1993, pp. 2209–2211 and May et al., Extended 10 Gbit/s fiber transmission distance at 1538 nm using a duobinary receiver, IEEE Phot. Technol. Lett., Vol. 6, No. 5, 1994, pp 648–650. The chirp parameter α is defined as $$\alpha = \frac{\frac{\partial \varphi}{\partial t}}{\frac{1}{2P}\frac{\partial P}{\partial t}}$$

where ϕ is the phase and P the intensity of the optical signal.

The duobinary signal is DC-free and its transmission spectrum is narrower than the spectrum of the binary signal. If the duobinary signal is modulated on a carrier, the modulated signal will behave as a double sideband signal with suppressed carrier.

The main benefit with duobinary transmission is that the transmission spectrum is reduced compared to ordinary binary transmission. In a dispersion limited system, the transfer length is inversely proportional to the square of the bandwidth of the transmission spectrum. This means that if the transmission spectrum is reduced to one half the transfer length is quadrupled.

Further, since the carrier frequency is suppressed in the duobinary transmission spectrum, the limitation for the output optical power due to stimulated Brillouin scattering in the fiber can be relaxed.

Optical duobinary transmission can be considered as a three-level signaling scheme which can be detected with an ordinary binary receiver. The normal marks in binary transmission are "0" and "1", whether the marks in duobinary transmission are "−1", "0", and "1", In the optical case, the duobinary marks are modulated as "−√P", "0", and "√P", where P is the optical peak power. These will be interpreted as "P", "0", and "P" in an ordinary opto-electric quadratic detector.

A common way to construct an optical duobinary transmitter is to make use of a double-electrode Mach-Zehnder (DEMZ) modulator, see, e.g. the U.S. Pat. No. 5,543,952 or the international application WO 95/29539. The DEMZ-modulator has also been proposed for adjustable chirp applications, see A. H. Gnauck et al., Dispersion penalty reduction using an optical modulator with adjustable chirp, IEEE Phot. Technol. Lett., Vol. 3, No. 10, 1991, pp 916–918, as well as simultaneous 2:1 multiplexing and modulation, see P. B. Hansen et al., A dual-drive Ti:LiNbO$_3$ Mach-Zehnder Modulator used as an optoelectric logic gate for 10 Gbit/s simultaneous multiplexing and modulation, IEEE Phot. Technol. Lett., Vol. 4, No. 6, 1992, pp 592–593.

A typical optical duobinary transmitter based on a DEMZ-modulator according to prior art is explained with reference to the layout as shown in FIG. 1.

The input signal of the transmitter is an electrical binary signal S1 and its complement S2=$\overline{S1}$. Each of these signals is fed through a binary-to-duobinary encoder 1, 3 and an AC-amplifier 5, 7. The resulting duobinary, i.e. three-level, signals S3, S4 are amplified and then used as driving signals of the electrodes of the modulator 9.

Continuous light from a laser diode 11 is coupled into the modulator 9 and split into two components in the Y-junction 9a of the left part of the modulator. The light in the two branches 9b, 9c of the modulator will then undergo positive or negative phase shift in the middle part of the modulator, the phase shift being controlled through the linear electro-optic effect by the applied voltage, i.e. the duobinary driving signals S3, S4, of the electrodes of the modulator. The phase shift in the upper branch is controlled by the upper electrode, and the phase shift in the lower branch is controlled by the lower electrode. The electrodes are supplied by bias voltage 13 in order to obtain the same phase shift in the two branches when no driving signals are applied to the electrodes.

The light in the two branches are then combined coherently in the Y-junction 9d in the right part of the modulator. If there is a 0° phase shift between the components, all light will be injected in the outgoing optical waveguide. If there is a 180° phase shift, no light will be injected in the outgoing waveguide. In the latter case, the light will be radiated into the modulator.

The coding procedure for duobinary transmission is very simple. In FIG. 2 is shown the binary-to-duobinary encoder 1 which converts the binary signal S1 into a duobinary signal S3 by using two flip-flops 15, 17 and a clock pulse 19. The flip-flops have binary output signals S5, S6, which are equal to the input binary signal but shifted one bit and two bits, respectively. The binary output signals S5, S6 are then fed through an adder 21 with the following function

S3=S5+S6−1 thus, generating the duobinary signal S3. In FIG. 3 is shown an example of the output signal- S3 and the encoding intermediate signals S5, S6 for duobinary modulation of the binary signal S1. It may be observed that a direct transition between the marks "−1" and "1" never occurs in duobinary modulation. The binary-to-duobinary encoder 3 is constructed and functioning likewise with the only difference that the input signal S2 is the complement of the binary signal S1.

The introduced phase shift in the upper and in the lower branch of the optical duobinary modulator for each of the marks are indicated in FIG. 4a. The logical "1" mark corresponds to a light pulse with full amplitude and a 0° phase shift, the "0" mark corresponds to no light pulse at all as the two components are opposite in phase and cancel each other out, and the "−1" mark corresponds to a light pulse with full amplitude and a 180° phase shift.

FIG. 4b shows a polar graph (amplitude vs phase) of the locus of the optical output signal (thick solid line) and the location of each of the duobinary marks (dots). The phase of the optical output signal does not vary on its way between the marks. Therefore, dϕ/dt=0 and α=0 according to the formula presented above.

The main problem with a duobinary transmitter as described is that the chromatic dispersion still limits the transmission distance and may be a problem for long haul fiber transmission systems.

SUMMARY OF THE INVENTION

An object of the present invention is to provide an optical duobinary transmitter with an improved performance in terms of dispersion immunity.

This object among others is fulfilled by an inventive optical duobinary transmitter system and method, which introduces a blue-shift frequency chirp.

The inventive system and method comprises an input terminal, a driving circuit, a double electrode optical modulator, particularly of the Mach-Zehnder type, and an output terminal.

The input terminal is arranged to receive a first binary signal and the driving circuit, which is connected to said input terminal, is arranged to convert the first binary signal into a second and a third binary signal. The double electrode optical modulator is connected to the driving circuit in such a way that its upper and lower electrode may be driven by said second and third binary signal, respectively, said modulator being further arranged to modulate the amplitude and phase of an optical carrier according to the binary driving signals so as to provide an optical duobinary signal corresponding to said first binary signal and with a predetermined negative modulation chirp parameter. Finally, the output terminal, which is connected to the optical modulator, is arranged to feed an optical transmission line with the modulated optical duobinary signal.

Preferably, the driving circuit comprises a first and a second logical gate whose outputs are connected to the respective electrode of the double electrode optical modulator. The logical gates may be an AND- or a NAND-gate and an OR- or a NOR-gate, respectively.

The logical gates are driven by two binary signals that may be the outputs of either a demultiplexer or two flip-flops, which in turn is/are driven by the first binary signal.

The demultiplexer would be arranged to demultiplex the first binary signal, e.g. ABCDEFGH, into two binary signals, e.g. AACCEEGG* and *BBDDFFHH, respectively, where * denotes an undefined signal mark.

The two flip-flops would be serially connected and arranged to demultiplex the first binary signal, e.g. ABCDEFGH, into two binary signals, e.g. *ABCDEFGH and **ABCDEFGH, respectively.

Furthermore, the second and the third binary signals may be arranged to be amplified prior to driving the electrodes of the modulator.

The double electrode optical modulator is preferably arranged to introduce the same phase shift of the optical carrier components led through the two branches for a given applied voltage. The three optical duobinary marks may be provided as no light pulse (or a light pulse with a very low amplitude), a first light pulse with a high amplitude and a second light pulse with a high amplitude, the two latter light pulses being opposite in phase to each other.

The double electrode optical modulator may further be arranged to provide modulated light with a phase y having a negative time derivative, i.e. $d\phi/dt<0$, when the intensity of the modulated light is being raised.

In another embodiment of the present invention the upper and lower electrodes of the modulator are driven by a first and a second quasi-ternary signal. Preferably, the first and second quasi-ternary signals are provided with non-equidistant marks, e.g. "1", "0.25", "0" and "1", "0.75", "0", respectively, in order to obtain a predetermined amount of negative chirp, e.g. $\alpha_{3dB}=-0.5$.

An advantage of the invention is that it may into some extent compensate for dispersion in dispersive systems such as a fiber-optic system operating at 1550 nm in standard single mode fibers.

Another advantage is that it needs a lower receiver sensitivity for a given transmission distance as compared with the transmitter system described in prior art.

Still another advantage of the invention is that when the AC-amplifiers amplify binary signals instead of duobinary signals the demands on them are relaxed.

Yet another advantage is that the invention is easy and simple to implement and uses a minimum of coding electronics.

BRIEF DESCRIPTION OF THE DRAWINGS

The present invention will become more fully understood from the detailed description given hereinbelow and the accompanying FIGS. 5–11 which are given by way of illustration only, and thus are not limitative of the present invention.

FIG. 7a illustrates phase shifts in the upper and in the lower branch of the inventive duobinary transmitter of FIG. 5 for each of the duobinary marks.

FIG. 7b shows a polar graph of the locus of the optical output signal and the location of each of the duobinary marks of the inventive duobinary transmitter of FIG. 5.

FIG. 8 shows an optical duobinary transmitter according to a second preferred embodiment of the present invention.

FIG. 11a illustrates phase shifts in the upper and in the lower branch for each of the duobinary marks of an optical duobinary transmitter driven by quasi-ternary signals according to a third preferred embodiment of the present invention.

FIG. 11b shows a polar graph of the locus of the optical output signal and the location of each of the duobinary marks for an optical duobinary transmitter with phase shifts according to FIG. 11a.

DETAILED DESCRIPTION OF EMBODIMENTS

The duobinary transmitter according to the present invention is based on the DEMZ-modulator, but the modulation is completely different compared to the modulation technique as described in prior art.

Figure 5:
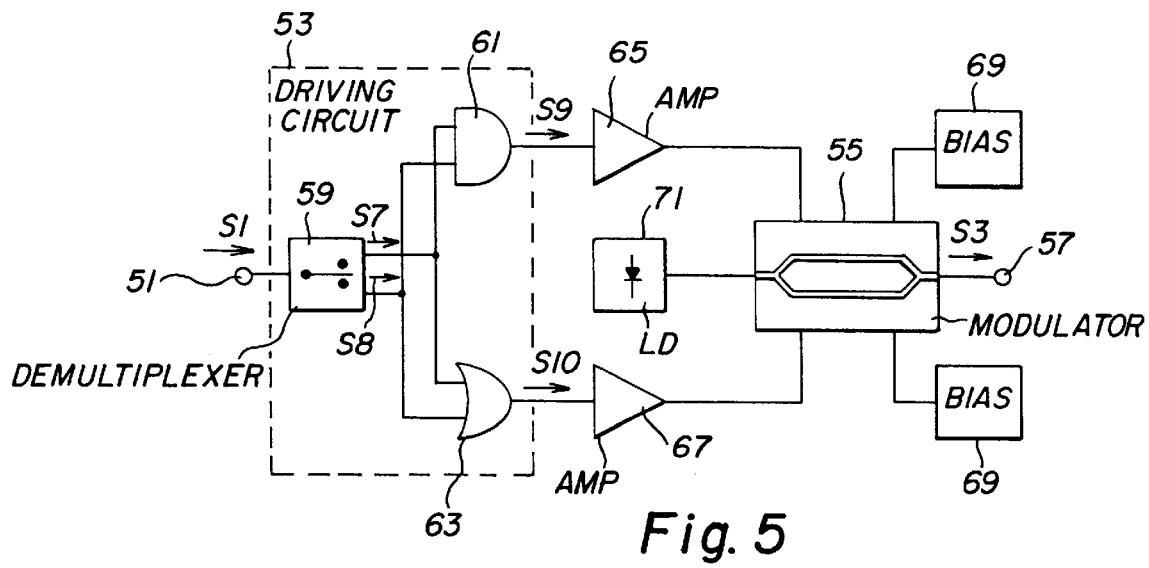
FIG. 5 shows an optical duobinary transmitter according to a preferred embodiment of the present invention.

A first preferred embodiment of the present invention will be described with reference to FIG. 5. An optical duobinary transmitter comprises an input terminal 51, a driving circuit 53, a double electrode optical modulator 55, preferably a DEMZ-modulator, and an output terminal 57.

The driving circuit is connected to the input terminal and comprises a demultiplexer 59 and two logical gates 61, 63, preferably an AND- and an OR-gate. The demultiplexer is arranged to demultiplex an input binary signal S1 into two binary signals S7 and S8, each having half the bit-rate of the input binary signal S1. In this case it is essential that these signals change its marks out of phase to each other. For example, an incoming signal sequence ABCDEFGH should be demultiplexed into the sequences AACCEEGG* and *BBDDFFHH, where * denotes an undefined signal mark.

If the demultiplexed signals S7 and S8 are already available at the input terminal no demultiplexer is needed. In this case a synchronization circuit (not shown in FIG. 5), e.g. comprising four flip-flops and the use of a clock pulse, may be arranged to synchronize the demultiplexed signals and assure that they change their marks out of phase to each other.

The logical gates, of which each has the two binary signals S7 and S8 as inputs, generate two binary signals S9 and S10 which in turn are used to drive the electrodes of the double electrode optical modulator 55.

AC-amplifiers 65, 67 may be arranged to amplify the binary signals S9 and S10, respectively, prior to driving the electrodes of the modulator.

The optical double electrode modulator 55, whose electrodes are supplied by bias voltage 69, is arranged to modulate the amplitude and phase of an optical carrier, e.g. continuous light from a laser diode 71, according to the binary driving signals so as to provide an optical duobinary signal S3 corresponding to the input binary signal S1 and with a predetermined negative modulation chirp parameter, i.e. $\alpha<0$. The output duobinary signal S3 contains the same data information as the input binary signal S1, but with a narrower transmission spectrum.

Finally, the output terminal 57 is connected to the optical modulator and arranged to feed an optical transmission line (not shown in FIG. 5) with the modulated optical duobinary signal S3.

Figure 6:
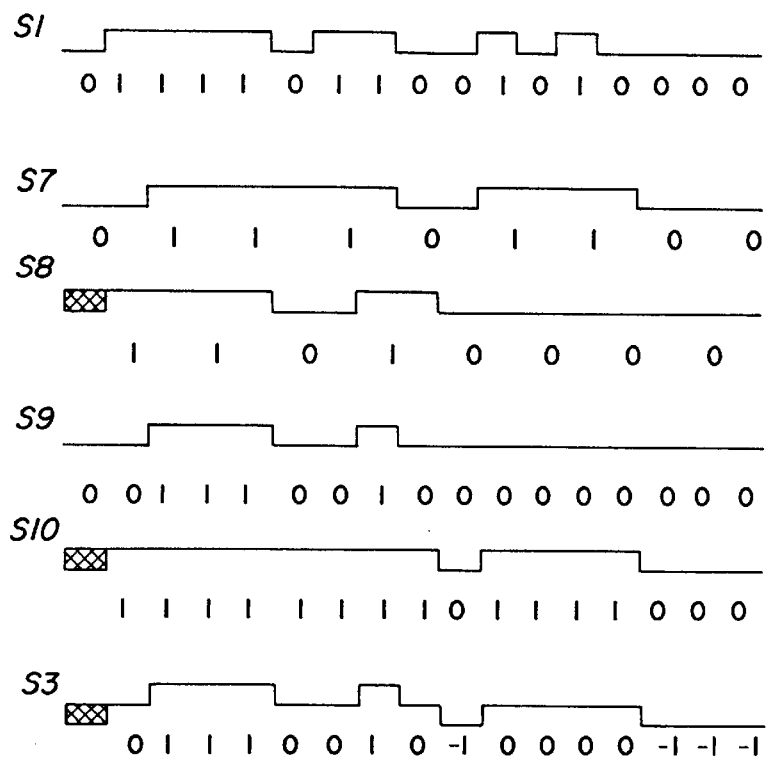
FIG. 6 illustrates an example of an output signal and encoding intermediates for duobinary modulation of a binary signal by the inventive optical duobinary transmitter of FIG. 5.

In FIG. 6 is shown an example of the output duobinary signal S3 and the encoding intermediate signals S7, S8, S9 and S10 for duobinary modulation of a binary signal S1 according to the present invention.

The double electrode optical modulator is preferably of the kind that it introduces substantially the same phase shift $\Delta\phi$ of the optical carrier light led through the two branches of the modulator for a given voltage shift $\Delta V$ of the corresponding driving signal, i.e. $\Delta\phi/\Delta V$ should be the same. This gives the best possibilities for obtaining a high-quality modulated signal.

When being driven by the binary signals S9 and S10, respectively, the double electrode optical modulator is arranged to provide the three optical duobinary signal marks "0", "1", "−1" as substantially no light pulse, and two light pulses with a high amplitude, but opposite in phase to each other.

In FIG. 7a is indicated the introduced phase shift in the upper and in the lower branch of the duobinary modulator for each of the marks. The "0" mark corresponds to substantially no light pulse at all as the two components are opposite in phase and cancel each other out, the logical "1" mark corresponds to a light pulse with full amplitude and a 0° phase shift, and the "−1" mark corresponds to a light pulse with full amplitude and a 180° phase shift. It is assumed that the light in the upper branch of the modulator undergoes negative phase shift and the light in the lower branch undergoes positive phase shift when the electrode voltage goes high.

Particularly, it may be observed from FIGS. 6 and 7a that the marks of the binary signals S9 and S10, and consequently the introduced phase shift of the upper and the lower branch of the modulator, never change simultaneously. This is an essential feature necessary for providing the desired properties of this embodiment of the present invention.

FIG. 7b shows a polar graph (amplitude vs phase) of the locus of the optical output signal (thick solid line) and the location of each of the duobinary marks (dots).

The upper arm of the interferometer is modulated between 0° and 180° using the first and the second quadrant of the polar diagram, and the lower arm is modulated between 0° and −180° using the third and the fourth quadrant. The phase of the optical output signal varies between 90° and 0° on its way between the "0" and the "1" mark as indicated in the figure. Therefore, $d\phi/dt<0$ when $dP/dt>0$, which gives $\alpha<0$ according to the formula presented in the description of related art. Between the "0" and the "−1" mark the phase varies between −90° and −180°. Again, $d\phi/dt<0$ when $dP/dt>0$, which gives $\alpha<0$.

Consequently, the optical modulator is arranged to provide modulated light with a phase $\phi$ having a negative time derivative, i.e. $d\phi/dt<0$, when the intensity of the modulated light is being increased and a positive time derivative, i.e. $d\phi/dt>0$, when the intensity of the modulated light is being decreased.

For all traces the chirp parameter $\alpha$ is less than zero, which means that blue-shift frequency chirp occurs. This frequency chirp can to some extent compensate for dispersion in anomalous dispersive systems such as fiberoptic systems operating at 1550 nm on SSMF. The chirp parameter $\alpha_{3dd}$ is defined at half the optical peak power and equals −1 in the embodiment as described. This value is slightly higher than the optimum value.

The proposed inventive modulation scheme can be implemented with very little additional electronics compared to a conventional duobinary transmission link. At the transmitter side, the adder may be substituted by two logical gates such as one AND-gate and one OR-gate. At the receiver side, no supplementary devices are needed. A standard duobinary receiver may be used.

The benefits of the narrow frequency signal spectrum for duobinary transmission and of the dispersion compensation properties of chirped modulation are combined. Moreover, the AC-amplifiers are in this case driven with binary signals. In comparison to the traditionally duobinary modulation scheme, the binary drive signals will relax the demands of the AC-amplifiers.

FIG. 8 shows a second preferred embodiment of an optical duobinary transmitter according to the present invention. This transmitter is very similar to the one described above, the driving circuit 73 being the only different part.

The driving circuit 73 comprises two serially connected D-flip-flops 75, 77 and a clock pulse 79 instead of the demultiplexer. The D-flip-flops are arranged to convert an input binary signal S1 into two binary output signals S11 and S13, respectively, each having the full bit-rate of the input binary signal S1. In this arrangement, an incoming signal sequence of ABCDEFGH is converted into the two sequences *ABCDEFGH and **ABCDEFGH, respectively, i.e. the binary output signals being equal to the input binary pulse but shifted one bit and two bits, respectively.

The logical gates 61, 63, of which in this embodiment each has the two binary output signals S11 and S12 as inputs, generate two binary signals S13 and S14 which in turn are used to drive the electrodes of the double electrode optical modulator 55. The signals S13 and S14 are identical with the signals S9 and S10 provided that the logical gates are the same. Hence, the modulators of the first and second preferred embodiment are driven by identical signals and generate identical duobinary signals. Consequently, a desirable blue-shift frequency chirp of the modulated signal is obtained also in this embodiment.

Figure 9:
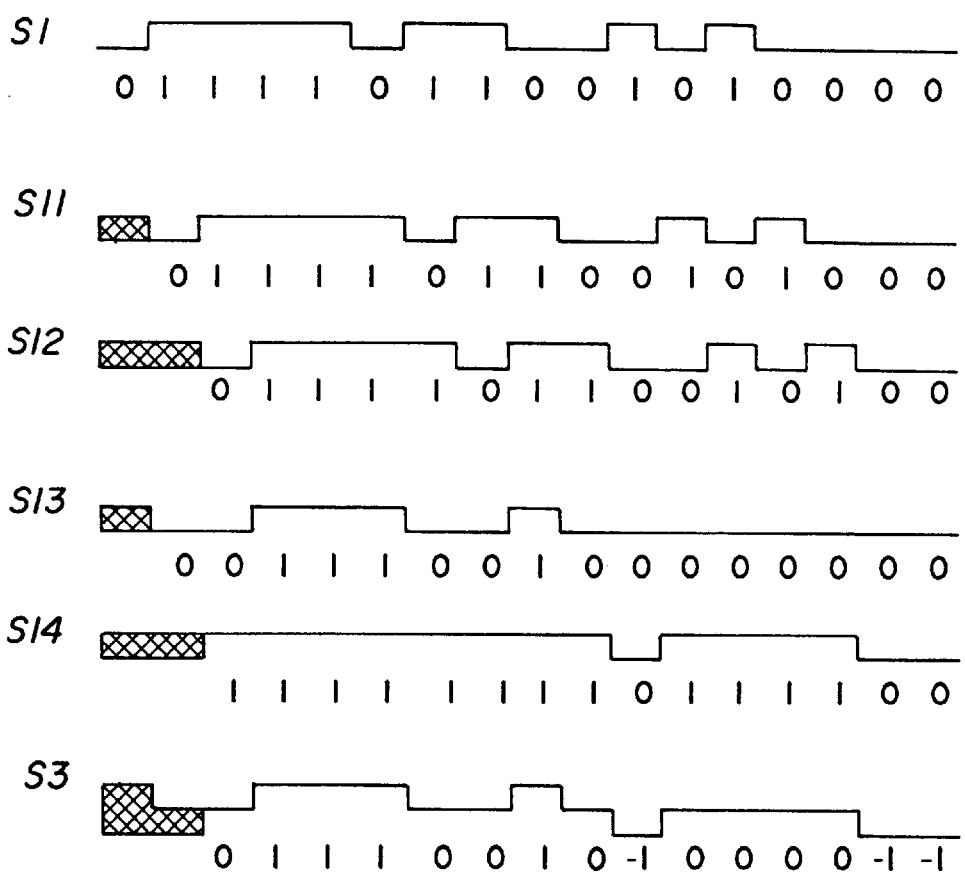
FIG. 9 illustrates an example of output signal and encoding intermediates for duobinary modulation of a binary signal by the inventive optical duobinary transmitter shown in FIG. 8.

In FIG. 9 is shown an example of the output duobinary signal S3 and the encoding intermediate signals S11, S12, S13, and S14 for duobinary modulation of a binary signal S1 according to the second preferred embodiment of the present invention.

Other possible driving circuits that are compatible with the present invention use other type of logical gates. For instance, using LiNbO$_3$ as the wave guide medium of the modulator it is possible to use any of the combinations listed in Table 1 with appropriate choices of types of electrodes and biasing voltages. Table 1.

TABLE 1

| 1 | x-cut | AND | OR |
|---|---|---|---|
| 2 | x-cut | AND | NOR |
| 3 | x-cut | NAND | OR |
| 4 | x-cut | NAND | NOR |
| 5 | y-cut | AND | NOR |
| 6 | y-cut | NAND | OR |

It is possible to use inverted or non-inverted driving stages. The principle of obtaining the binary driving signals is the same.

Other possible materials for the waveguides of the modulator are semiconductor materials such as, e.g., InP. Using these materials it is easier to provide modulators with the same $\Delta\phi/\Delta V$ for the two branches.

Figure 1:
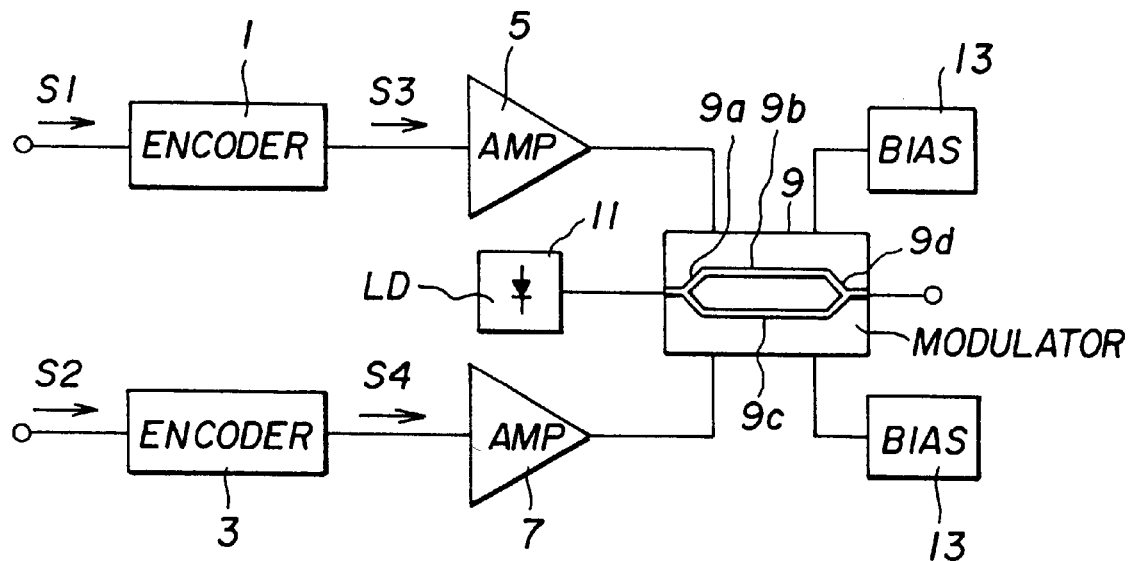
FIG. 1 shows an optical duobinary transmitter according to prior art.
Figure 2:
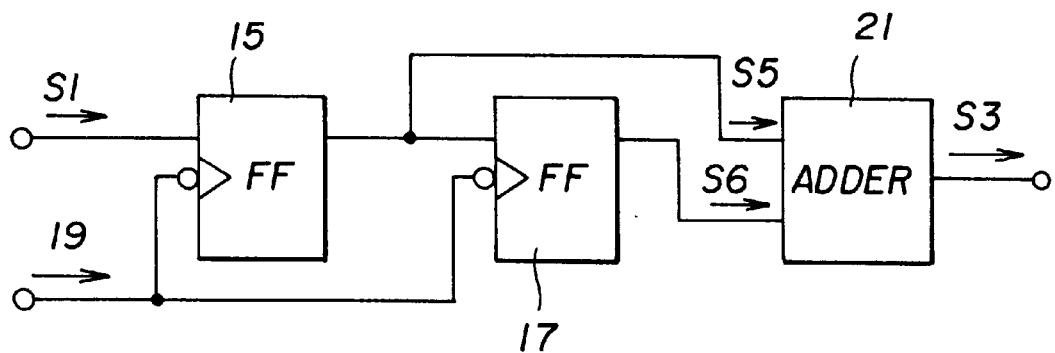
FIG. 2 shows an encoder circuit for converting a binary signal into a duobinary signal according to prior art.
Figure 3:
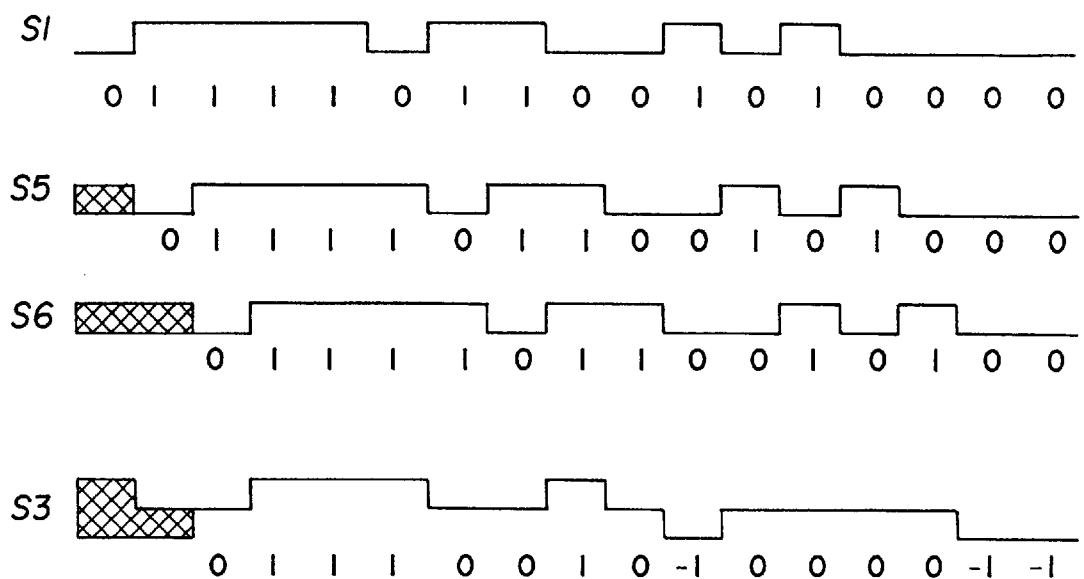
FIG. 3 illustrates one example of an output signal and encoding intermediates for encoding of a binary signal according to prior art.
Figures 4A, 4B:
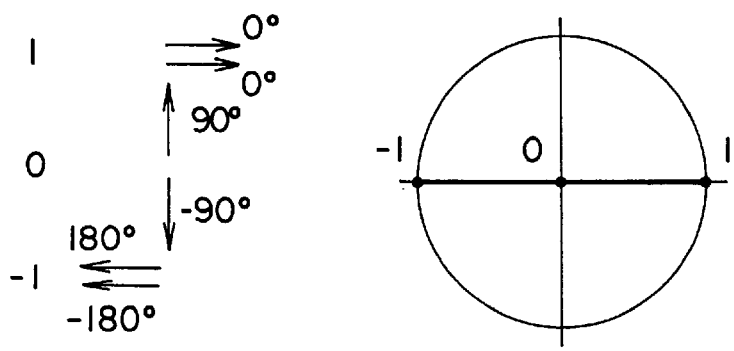
FIG. 4a illustrates phase shifts in the upper and in the lower branch of the optical duobinary transmitter of FIG. 1 for each of the duobinary marks.
FIG. 4b shows a polar graph of the locus of the optical output signal and the location of each of the duobinary marks of the duobinary transmitter of FIG. 1.

A theoretical comparison study has been performed of four different modulation schemes:
1. Intensity modulation with no chirp
2. Intensity modulation with chirp
3. Duobinary modulation with no chirp
4. Duobinary modulation with chirp according to the invention The first scheme comprises a DEMZ-modulator modulated on both its electrodes with two synchronously binary signals. The modulation scheme corresponds to the transition between the "1" mark and the "0" mark of FIG. 4b. The peak-to-peak drive voltage is $V_\Pi/2$ and the required slow-rate for the drive signal is $V_\Pi/2T$, where T is the time between the marks and $V_\Pi$ is the voltage that shifts the phase of the light 180°.

In the second modulation scheme the DEMZ-modulator is modulated on its upper electrode with a single binary signal. The scheme corresponds to the transition between the "1" mark and the "0" mark of FIG. 7b. The peak-to-peak drive voltage is $V_h$ and the required slow-rate for the drive signal is $V_\Pi/T$.

The third scheme comprises a DEMZ-modulator modulated on both its electrodes with two synchronously three-level signals. The modulation scheme coincides with the one described in related art. The peak-to-peak drive voltage is $V_{529}$ and the required slow-rate for the drive signal is $V_\Pi/2T$. In this case, a direct transition between the marks "1" and "−1", and vice versa never occurs.

In the fourth modulation scheme the DEMZ-modulator is modulated on both its electrodes with two binary signals that are out of phase to each other. The modulation coincides with the one depicted in the -present invention. The peak-to-peak drive voltage is $V_\Pi$ and the required slow-rate for the drive signal is $V_{529}/T$. Neither in this scheme a direct transition between the marks "1" and "−1", and vice versa occurs.

The performance of the four modulation schemes has been analyzed by using a raised cosine type drive signal as input signal to the DEMZ-modulator and a 4th order Bessel filter as receiver filter optimized according to the ITU (International Telecommunication Union) norm. The bit-rate was set to 10 Gbit/s and the dispersion parameter for the fiber was D=17 ps/nm/km corresponding to an STM-64 (Synchronous Transfer Mode) system operating at 1550 nm on SSMF. The fiber was modelled as a phase-revolving filter with the transfer function $$H_{SSMF}(\omega) = e^{j\frac{\lambda^2 DL(\omega_c - \omega)^2}{4\pi c}}$$

where $\lambda$ is the wavelength, D the dispersion parameter, L the transfer length, $\omega_c$ the carrier frequency, $\omega$ the signal frequency, and c the velocity of light in vacuum.

Furthermore, a commercial erbium doped fiber amplifier (EDFA) was used as a pre-amplifier at the receiver side (amplification G=29 dB and noise factor F=4.5 dB). The output signal from the EDFA was then filtered through a Fabry-Perot filter ($\Delta\lambda$=2.5 nm).

Figure 10:
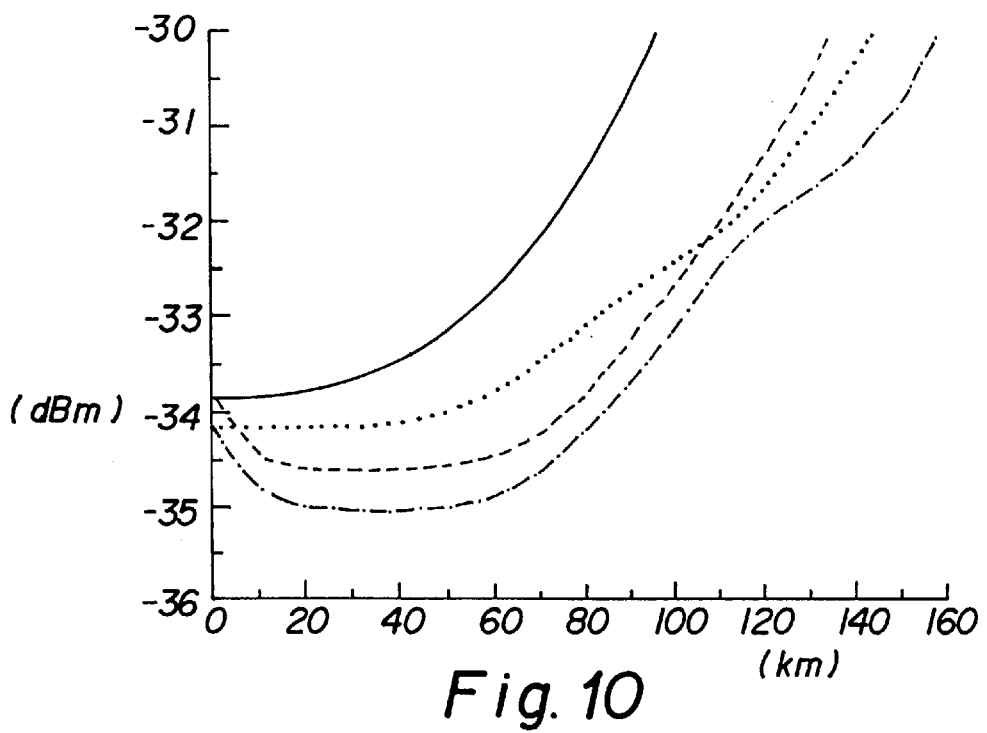
FIG. 10 shows receiver sensitivity for three different modulation schemes according to prior art and one modulation scheme according to the present invention as simulated for different transfer lengths.

In FIG. 10 is shown the result of the investigation in terms of the receiver sensitivity in decibel vs the transfer length in kilometers. The solid line corresponds to intensity modulation with no chirp, the dashed line to intensity modulation with chirp, the dotted line to duobinary modulation with no chirp, and the dashed-dotted line to duobinary modulation with chirp according to the invention. A bit-error-rate of $1*10^{-9}$ is assumed for the four different modulation schemes. As can be seen in the Figure the fourth modulation scheme, i.e. duobinary modulation with chirp, shows the best performance for all transfer lengths considered, i.e. 0–160 km.

In a third preferred embodiment of an optical duobinary transmitter according to the present invention the driving signals are quasi-ternary instead of binary. The chirp parameter $\alpha_{3dB}$ may hereby be optimized at the cost of a more complex driving circuit. For example, if a chirp parameter of −0.5 at the 3 dB point is desired, the acquired phase shift in the two branches of the modulator shall have a ratio of 1:3. This is realized by converting an input binary signal into two quasi-ternary signals, the one driving the electrode of the upper branch of the modulator having the three marks "1", "0.25" and "0", and the one driving the electrode of the lower branch of the modulator having the three marks "1", "0.75" and "0".

In FIG. 11a is shown the introduced phase shift in the upper and in the lower branch of the duobinary modulator for each of the marks. The "0" mark corresponds to substantially no light pulse at all as the two components are opposite in phase and cancel each other out, the logical "1" mark corresponds to a light pulse with full amplitude and a 0° phase shift, and the "−1" mark corresponds to a light pulse with full amplitude and a 180° phase shift. It is assumed that the light in the upper branch of the modulator undergoes negative phase shift and the light in the lower branch undergoes positive phase shift when the electrode voltage goes high.

It may be observed from 11a that the marks of the quasi-ternary signals, and consequently the introduced phase shift of the light in the upper and the lower branch of the modulator, change simultaneously in this embodiment.

FIG. 11b shows a polar graph (amplitude vs phase) of the locus of the optical output signal (thick solid line) and the location of each of the duobinary marks (dots).

The new inventive system and method for duobinary transmission as described in the present patent application combines the narrow spectrum that duobinary transmission offers with the dispersion compensation properties that chirped techniques offer. In the theoretical study it is shown that a modulation scheme according to one embodiment of the present invention shows overall better performance in terms of dispersion immunity compared to earlier known modulation techniques based on the DEMZ-modulator.

According to the first described embodiments of the present invention, the drivers for the DEMZ electrodes are driven with binary signals instead of three-level signals. This will relax the design demands of the driver circuits.

According to the last described embodiments of the present invention, the drivers for the DEMZ electrodes are driven with quasi-ternary signals instead of ordinary duobinary signals. The chirp parameter may hereby be optimized.

The invention being thus described, it will be obvious that the same may be varied in a plurality of ways. Such variations are not to be regarded as a departure from the scope of the invention. All such modifications as would be obvious to one skilled in the art are intended to be included within the scope of the following claims.

What is claimed is:

1. An optical duobinary transmitter system, comprising:
an input terminal arranged to receive a first binary signal,
a driving circuit connected to the input terminal and arranged to convert the first binary signal into second and third binary driving signals, said driving circuit including one of a demultiplexer and first and second flip-flops serially connected,
a double electrode optical modulator connected to the driving circuit such that upper and lower electrodes are driven by said second and third binary driving signals, respectively, said modulator being further arranged to modulate amplitude and phase of an optical carrier according to the binary driving signals so as to provide an optical duobinary signal corresponding to said first binary signal and having a predetermined negative modulation chirp parameter, and
an output terminal connected to the optical modulator and arranged to feed an optical transmission line with the modulated optical duobinary signal.

2. An optical duobinary transmitter system as claimed in claim 1, wherein the driving circuit comprises first and second logical gates, which output said second and third binary driving signals, respectively.

3. An optical duobinary transmitter system as claimed in claim 2, wherein the driving circuit being arranged to demultiplex the first binary signal (ABCDEFGH) into fourth and fifth binary signals (AACCEEGG*, *BBDDFFHH), respectively, said fourth and fifth binary signals driving the first and second logical gates.

4. An optical duobinary transmitter system as claimed in claim 2, wherein the driving circuit arranged to convert the first binary signal (ABCDEFGH) into sixth and seventh binary signals (*ABCDEFGH, **ABCDEFGH), respectively, said sixth and seventh binary signals driving the first and second logical gates.

5. An optical duobinary transmitter system as claimed in claim 2, wherein the first logical gate being an AND- or a NAND-gate and the second logical gate being an OR- or a NOR-gate, respectively.

6. An optical duobinary transmitter system as claimed in claim 1, wherein first and second AC-amplifiers are arranged to amplify the second and the third binary driving signals, respectively, prior to driving the electrodes of the modulator.

7. An optical duobinary transmitter system as claimed in claim 1, wherein the double electrode optical modulator being a Mach-Zehnder type.

8. An optical duobinary transmitter system as claimed in claim 7, wherein the double electrode optical modulator being arranged to introduce the same phase shift $\Delta\phi$ of the optical carrier light input through the two branches of the modulator for a given voltage shift $\Delta V$ of the corresponding driving signal, wherein $\Delta\phi/\Delta V$ is the same for the two branches.

9. An optical duobinary transmitter system as claimed in claim 7, wherein the double electrode optical modulator being arranged to provide three optical duobinary signal marks as substantially no light pulse, a first light pulse with a high amplitude and a second light pulse with a high amplitude, the first and second light pulses being opposite in phase to each other.

10. An optical duobinary transmitter system as claimed in claim 9, wherein the double electrode optical modulator being arranged to provide modulated light with a phase $\phi$ having a negative time derivative, wherein $d\phi/dt<0$, and wherein when the intensity of the modulated light is being raised, $dP/dt>0$.

11. An optical duobinary transmitter method, comprising the steps of:
receiving a first binary signal,
converting said first binary signal into second and third binary signal driving signal by demultiplexing or shifting and duplicating,
modulating amplitude and phase of an optical carrier according to the second and third binary driving signals to provide an optical duobinary signal corresponding to said first binary signal and having a predetermined negative modulation chirp parameter, and
feeding an optical transmission line with the modulated optical duobinary signal.

12. An optical duobinary transmitter method as claimed in claim 11, further comprising the steps of demultiplexing the first binary signal (*ABCDEFGH*) into fourth and fifth binary signals (AACCEEGG*, *BBDDFFHH), respectively, and converting said fourth and fifth binary signals into the second and third binary signals, respectively, by performing logical operations.

13. An optical duobinary transmitter method as claimed in claim 12, wherein the logical operations being AND or NAND for the fourth binary signal and being OR or NOR for the fifth binary signal.

14. An optical duobinary transmitter method as claimed in claim 11, further comprising the steps of shifting and duplicating the first binary signal (*ABCDEFGH*) into sixth and seventh binary signals (*ABCDEFGH, ABCDEFGH*), respectively, and converting said sixth and seventh binary signals into the second and third binary signals, respectively, by performing logical operations.

15. An optical duobinary transmitter method as claimed in claim 14, wherein the logical operations being AND or NAND for the sixth binary signal and being OR or NOR for the seventh binary signal.

16. An optical duobinary transmitter method as claimed in claim 11, wherein the second and third binary signals, respectively, are amplified prior to modulating.

17. An optical duobinary transmitter method as claimed in claim 16, wherein three optical duobinary signal marks are provided as substantially no light pulse, a first light pulse with a high amplitude and a second light pulse with a high amplitude, the first and second light pulses being opposite in phase to each other.

18. An optical duobinary transmitter method as claimed in claim 17, wherein modulated light is provided with a phase $\phi$ having a negative time derivative $d\phi/dt<0$, and when the intensity of the modulated light is being raised $dP/dt>0$.

19. An optical duobinary transmitter system, comprising:

an input terminal arranged to receive a first binary signal, a driving circuit connected to the input terminal and arranged to convert the first binary signal into first and second quasi-ternary signals, a double electrode optical modulator connected to the driving circuit such that upper and lower electrodes are driven by said first and second quasi-ternary signals, respectively, said modulator being further arranged to modulate amplitude and phase of an optical carrier according to the quasi-ternary signals to provide an optical duobinary signal corresponding to said first binary signal and having a predetermined negative modulation chirp parameter, and an output terminal connected to the optical modulator and arranged to feed an optical transmission line with the modulated optical duobinary signal.

20. An optical duobinary transmitter system as claimed in claim 19, wherein the driving circuit being arranged to provide the first and second quasi-ternary signals with non-equidistant marks of "1", "0.25", "0" and "1", "0.75", "0", respectively, in order to obtain a predetermined amount of negative chirp $\alpha_{3dB}=-0.5$.

* * * * *